(12) United States Patent
Meng et al.

(10) Patent No.: US 10,411,523 B2
(45) Date of Patent: Sep. 10, 2019

(54) INTELLIGENT MULTI-MODE WIRELESS POWER SYSTEM

(71) Applicant: POWERSPHYR INC., Danville, CA (US)

(72) Inventors: David F. Meng, San Ramon, CA (US); William B. Wright, Boca Raton, FL (US)

(73) Assignee: PowerSphyr Inc., Danville, CA (US)

( * ) Notice: Subject to any disclaimer, the term of this patent is extended or adjusted under 35 U.S.C. 154(b) by 643 days.

(21) Appl. No.: 15/092,531

(22) Filed: Apr. 6, 2016

(65) Prior Publication Data

US 2017/0294810 A1    Oct. 12, 2017

(51) Int. Cl.
| | | |
|---|---|---|
| *H02J 50/80* | (2016.01) | |
| *H02J 50/12* | (2016.01) | |
| *H02J 7/02* | (2016.01) | |
| *H02J 50/20* | (2016.01) | |
| *H02J 50/90* | (2016.01) | |

(52) U.S. Cl.
CPC ............. *H02J 50/80* (2016.02); *H02J 7/025* (2013.01); *H02J 50/12* (2016.02); *H02J 50/20* (2016.02); *H02J 50/90* (2016.02)

(58) Field of Classification Search
CPC .................................. H02J 7/025; H02J 50/80
USPC ........................................................ 320/108
See application file for complete search history.

(56) References Cited

U.S. PATENT DOCUMENTS

| | | |
|---|---|---|
| 6,289,237 B1 | 9/2001 | Mickle et al. |
| 6,615,074 B2 | 9/2003 | Mickle et al. |
| 6,856,291 B2 | 2/2005 | Mickle et al. |
| 6,886,685 B2 | 5/2005 | Slater |

(Continued)

FOREIGN PATENT DOCUMENTS

| | | |
|---|---|---|
| EP | 2387127 A2 | 11/2011 |
| EP | 2579424 A2 | 4/2013 |

(Continued)

OTHER PUBLICATIONS

Jorgesen et al.: "Balun Basics Primer: A Tutorial on Baluns, Balun Transformers, Magic-Ts, and 180 degree Hybrids", Marki Microwave, Inc., 2014, 12 pages.

(Continued)

*Primary Examiner* — Richard V Muralidar
(74) *Attorney, Agent, or Firm* — Knobbe, Martens, Olson & Bear, LLP

(57) ABSTRACT

The present disclosure provides a method and system for intelligently managed multi-mode wireless transfer of energy for charging and/or powering electronics devices. Such a system may include a near field energy transfer mode and a far field energy transfer mode that when intelligently combined or used selectively at particular ranges yields an overall improved result. An energy transfer unit connected to a power source may transfer energy over-the-air within range of at least one mode to one or more electronic devices integrated with an energy receiving unit for converting transferred energy to usable power suitable for charging and/or powering of the electronic device. The system may intelligently manage the selection, combination and/or switching of modes as optimally determined by at least one integrated control circuit combined with a communications protocol.

4 Claims, 4 Drawing Sheets

(56) References Cited

U.S. PATENT DOCUMENTS

| | | |
|---|---|---|
| 7,027,311 B2 | 4/2006 | Vanderelli et al. |
| 7,057,514 B2 | 6/2006 | Mickle et al. |
| 7,639,994 B2 | 12/2009 | Greene et al. |
| 7,643,312 B2 | 1/2010 | Vanderelli et al. |
| 7,741,734 B2 | 6/2010 | Joannopoulos et al. |
| 7,812,771 B2 | 10/2010 | Greene et al. |
| 7,825,543 B2 | 11/2010 | Karalis et al. |
| 7,844,306 B2 | 11/2010 | Shearer et al. |
| 7,868,482 B2 | 1/2011 | Greene et al. |
| 7,898,105 B2 | 3/2011 | Greene et al. |
| D636,333 S | 4/2011 | Kulikowski |
| 7,925,308 B2 | 4/2011 | Greene et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,115,448 B2 | 2/2012 | John |
| 8,159,090 B2 | 4/2012 | Greene et al. |
| 8,159,364 B2 | 4/2012 | Zeine |
| 8,304,935 B2 | 11/2012 | Karalis et al. |
| 8,324,759 B2 | 12/2012 | Karalis et al. |
| 8,362,651 B2 | 1/2013 | Hamam et al. |
| 8,378,522 B2 | 2/2013 | Cook et al. |
| 8,395,282 B2 | 3/2013 | Joannopoulos et al. |
| 8,395,283 B2 | 3/2013 | Joannopoulos et al. |
| 8,400,017 B2 | 3/2013 | Kurs et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Kurs et al. |
| 8,410,953 B2 | 4/2013 | Zeine |
| 8,432,062 B2 | 4/2013 | Greene et al. |
| 8,441,154 B2 | 5/2013 | Karalis et al. |
| 8,446,248 B2 | 5/2013 | Zeine |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,461,817 B2 | 6/2013 | Martin et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,158 B2 | 7/2013 | Kurs et al. |
| 8,487,480 B1 | 7/2013 | Kesler et al. |
| 8,497,601 B2 | 7/2013 | Hall et al. |
| D692,010 S | 10/2013 | Verghese |
| 8,552,592 B2 | 10/2013 | Schatz et al. |
| 8,558,661 B2 | 10/2013 | Zeine |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Kurs et al. |
| 8,621,245 B2 | 12/2013 | Shearer et al. |
| D697,477 S | 1/2014 | Jonas, III |
| 8,629,578 B2 | 1/2014 | Kurs et al. |
| 8,643,326 B2 | 2/2014 | Campanella et al. |
| 8,667,452 B2 | 3/2014 | Verghese et al. |
| 8,669,676 B2 | 3/2014 | Karalis et al. |
| 8,686,598 B2 | 4/2014 | Schatz et al. |
| 8,692,410 B2 | 4/2014 | Schatz et al. |
| 8,692,412 B2 | 4/2014 | Fiorello et al. |
| D705,745 S | 5/2014 | Kurs et al. |
| 8,716,903 B2 | 5/2014 | Kurs et al. |
| 8,723,366 B2 | 5/2014 | Fiorello et al. |
| 8,729,737 B2 | 5/2014 | Schatz et al. |
| 8,760,007 B2 | 6/2014 | Joannopoulos et al. |
| 8,760,008 B2 | 6/2014 | Joannopoulos et al. |
| D709,855 S | 7/2014 | Jonas |
| 8,766,485 B2 | 7/2014 | Joannopoulos et al. |
| 8,772,971 B2 | 7/2014 | Joannopoulos et al. |
| 8,772,972 B2 | 7/2014 | Joannopoulos et al. |
| 8,772,973 B2 | 7/2014 | Kurs |
| 8,791,599 B2 | 7/2014 | Joannopoulos et al. |
| 8,805,530 B2 | 8/2014 | John |
| 8,836,172 B2 | 9/2014 | Hamam et al. |
| 8,847,548 B2 | 9/2014 | Kesler et al. |
| 8,854,176 B2 | 10/2014 | Zeine |
| 8,875,086 B2 | 10/2014 | Verghese et al. |
| 8,901,778 B2 | 12/2014 | Kesler et al. |
| 8,901,779 B2 | 12/2014 | Kesler et al. |
| 8,907,531 B2 | 12/2014 | Hall et al. |
| 8,928,276 B2 | 1/2015 | Kesler et al. |
| 8,937,408 B2 | 1/2015 | Ganem et al. |
| D722,048 S | 2/2015 | Kurs et al. |
| 8,963,488 B2 | 2/2015 | Campanella et al. |
| 9,000,616 B2 | 4/2015 | Greene et al. |
| 9,021,277 B2 | 4/2015 | Shearer et al. |
| 9,142,973 B2 | 9/2015 | Zeine |
| 9,143,000 B2 | 9/2015 | Leabman et al. |
| 9,240,824 B2 | 1/2016 | Hillan et al. |
| 9,608,472 B2 | 3/2017 | Moshfeghi |
| 2004/0150934 A1 | 8/2004 | Baarman |
| 2005/0206577 A1 | 9/2005 | Lee |
| 2008/0054638 A1* | 3/2008 | Greene .................. H02J 17/00 290/1 R |
| 2010/0127660 A1 | 5/2010 | Cook et al. |
| 2010/0190436 A1 | 7/2010 | Cook et al. |
| 2010/0244576 A1 | 9/2010 | Hillan et al. |
| 2012/0062358 A1 | 3/2012 | Nowottnick |
| 2013/0026981 A1* | 1/2013 | Van Der Lee .......... H02J 5/005 320/108 |
| 2013/0221915 A1 | 8/2013 | Son et al. |
| 2014/0327323 A1 | 11/2014 | Masaoka et al. |
| 2015/0011160 A1 | 1/2015 | Jurgovan et al. |
| 2016/0020637 A1 | 1/2016 | Khlat |
| 2016/0285489 A1 | 9/2016 | Gong et al. |
| 2016/0301257 A1 | 10/2016 | Parks et al. |

FOREIGN PATENT DOCUMENTS

| | | |
|---|---|---|
| EP | 2755300 A1 | 7/2014 |
| WO | 2015064815 A1 | 5/2015 |
| WO | 2016164321 A1 | 10/2016 |

OTHER PUBLICATIONS

International Search Report & Written Opinion for PCT Application PCT/US2017/057015 dated Jan. 18, 2018, 23 pages.
International Search Report & Written Opinion for PCT Application PCT/US2017/026186 dated Jul. 14, 2017, 17 pages.

* cited by examiner

INTELLIGENT MULTI-MODE WIRELESS POWER SYSTEM

BACKGROUND OF THE INVENTION

1. Field of the Invention

The present disclosure relates to providing wireless power to electric or electronic devices and more particularly to improving the wireless transfer of power to devices for charging and/or sustaining power to those device loads.

2. Description of the Related Art

Common electric or electronic devices consume significant levels of electric power with use and a considerable amount of usage occurs while away from main AC power sources traditionally used to supply power to such devices. Due to battery storage limitations, the need for frequent recharging exists in order to sustain device operation. Furthermore, the prevalence of portable electronic devices and devices operating in areas where immediate physical connection with a traditional power source is unavailable, has resulted in increased complexity for management and maintenance of connected electrical power adapters and traditional power sources dependent on power conducting cables.

Current solutions to this problem are based on a singular type of wireless power transfer typically involving magnetic induction, resonating coils or electromagnetic microwave radiation whereby the restrictions on use and distance result in either higher power at short distances or lower power at greater distances. Nevertheless, an obvious combination of two singular incompatible wireless powering techniques is ineffective for consideration as one viable solution when combined. For the foregoing reasons, there is a need for an intelligent system to provide a comprehensive multi-mode wireless power delivery solution without said limitations.

SUMMARY OF THE INVENTION

In one aspect, the present invention is embodied as a system and method of providing intelligent wireless power to a device load. This includes a) transmitting a directed energy signal over-the-air from an energy transferring unit (ETU) to an energy receiving unit (ERU) of a device load in a first mode when the ERU is in the proximity of a far field range of the ETU; and, b) generating a resonant magnetic field over-the-air by the ETU wherein the resonant magnetic field is coupled with an ERU magnetic field at the same resonant frequency of the device load in a second mode when the ERU is in the proximity of a near field coupling range of the ETU. Energy is transferred to the ERU from the ETU selectively and intelligently by managing the directed energy signal transmission and the resonant magnetic field to deliver energy as needed by one or both modes simultaneously and with consideration to the device load's energy requirement, energy priority and device load's range relative to the ETU.

In one embodiment, the ETU includes a far field transmitter configured to wirelessly transmit the directed energy signal; and, a source resonator configured to generate the resonate magnetic field. The ERU includes a far field receiver configured to wirelessly receive the directed energy signal transmitted from the far field transmitter; and, a capture resonator configured to capture resonant magnetic energy in the near field generated by the source resonator.

In one aspect, the present invention is embodied as a method of managing multi-mode transfer of wireless power. The method includes intelligently optimizing the wireless transfer of energy from a multi-mode energy transfer unit (ETU), and capturing and receiving the optimized energy transferred wirelessly over varying distances by one or more energy receiving units (ERU's).

The present invention via a novel approach, addresses the current shortcomings of existing single-mode wireless power delivery systems such as low energy transfer from a far field source or limited spatial freedom from a near field source which are exclusively inherent to these technologies while obviating the need for traditional wired or cabled power delivery methods. The advantages of the present invention include increased efficiency, added redundancy for applications where critical loss of available power could be detrimental to the device user and optional spatial versatility when lower energy transfer rates are acceptable while sustaining power to or charging an electric or electronic device.

DETAILED DESCRIPTION OF THE INVENTION

Figure 1:
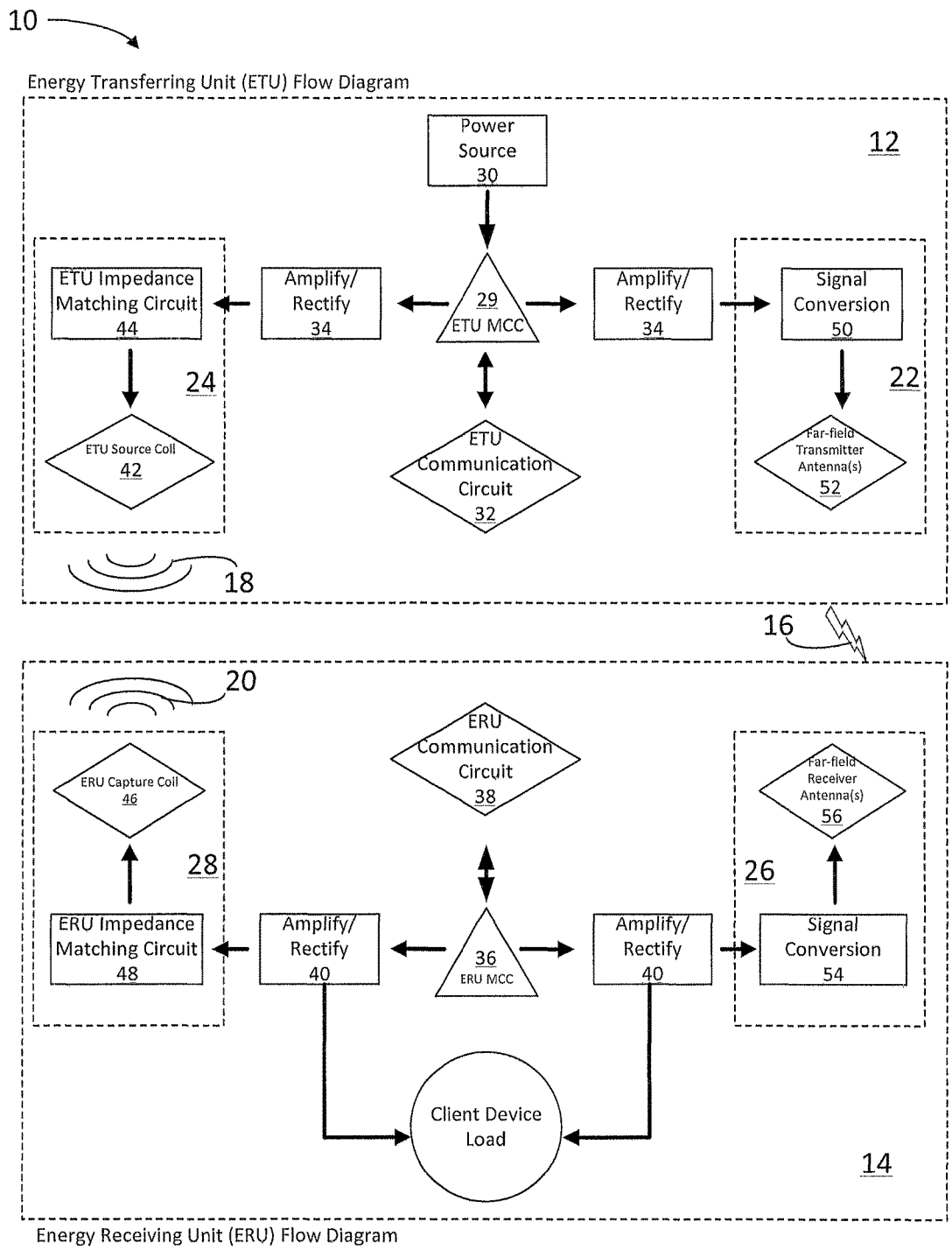
FIG. 1 is a schematic illustration of the system for providing intelligent wireless power to a device load, including an energy transfer unit (ETU) and energy receiving unit (ERU), in accordance with the principles of the present invention.

Referring now to the drawings and the characters of reference marked thereon, FIG. 1 illustrates the system for providing intelligent wireless power to a device load in accordance with the principles of the present invention, designated generally as 10. The system 10 includes an energy transferring unit (ETU) 12 and an energy receiving unit (ERU) 14. The ETU 12 is configured to 1) transmit a directed energy signal 16 over-the-air in a first mode and 2) generate a resonate magnetic field 18 over-the-air in a second mode, as will be explained in detail below. The ERU 14 is configured to 1) receive the directed energy signal 16 from the ETU 12 when the ERU is in the proximity of a far field range of the ETU; and 2) couple an ERU magnetic field 20 thereof to the resonate magnetic field 18 in the second mode when the ERU is in the proximity of a near field range of the ETU, as will be explained in detail below.

The ETU 12 includes a far field transmitter 22 configured to wirelessly transmit the directed energy signal 16; and, a source resonator 24 configured to generate the resonant magnetic field 18. The ERU 14 includes a far field receiver 26 configured to wirelessly receive the directed energy signal 16 transmitted from the far field transmitter 22; and, a capture resonator 28 configured to capture resonant magnetic energy 18 in the near field generated by the source resonator 24.

In one embodiment, the ETU 12 includes an ETU microcontroller circuit (ETU MCC) 29 operatively connected to a power source 30 and configured to intelligently induce wireless transfer of energy within the near field, far field or both as required, and to manage the distribution and priority of energy transfer. An ETU communications circuit 32 is configured to communicate information between the ETU 12 and ERU 14. An ETU amplifier/rectifier circuit 34 is configured to convert the energy for the source resonator 24 and the far field transmitter 22.

In one embodiment, the ERU 14 includes an ERU microcontroller circuit (ERU MCC) 36 configured to intelligently manage the distribution of transferred energy from the near field, far field or both modes as required. An ERU communications circuit 38 is configured to communicate information between the ETU 12 and ERU 14. An ERU amplifier/rectifier circuit 40 is configured to convert the energy from the capture resonator 28 and the far field receiver 26. The ERU MCC 36 may be integrated into one or more device loads to be charged or powered.

In one embodiment, the source resonator 24 includes a source coil 42 operatively connected to an ETU impedance matching circuit (ETU IMC) 44. The capture resonator 28 comprises a capture coil 46 operatively connected to an ERU impedance matching circuit 48.

The far field transmitter 22 includes a signal conversion module 50 and a far field transmitter antenna(s) 52 whereby the amplified/rectified power is converted by the signal conversion module 50 to an energy signal suitable for transmission via the far field transmitter antenna(s) 52.

The far field receiver 26 includes a signal conversion module 54 and a far field receiver antenna(s) 56.

The transmitters and resonators convert electrical power to energy signals at an ISM frequency band appropriately optimized for the application of the system and within accordance of regulatory rules and laws governing such wireless operations.

Figure 2:
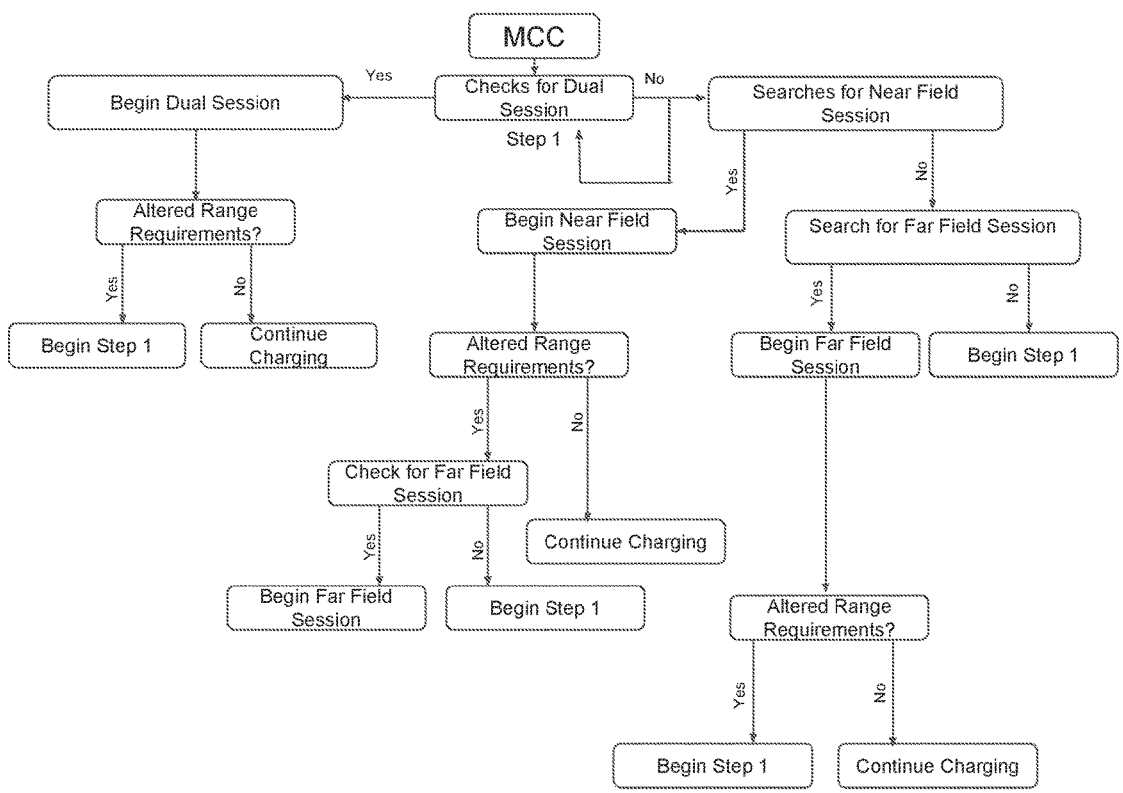
FIG. 2 is a flowchart showing the method for intelligent power transfer management via the MCC based on optimized mode requirements.

Referring now to FIG. 2, a flow chart of the method for intelligent energy transfer management via either the ETU MCC or the ERU MCC where applicable, based on optimized mode requirements, is illustrated. In a first step (Step 1), the MCC checks for the requirements of a dual session in order to provide a device load with as much power as efficiently possible for charging and powering of the device load. If dual session is determined by the ETU MCC to be available and appropriate, energy will be transferred from both near and far field sources. However, if there is a determination as to whether altered range requirements exist (i.e. the device load moves out of a particular range where a dual session is no longer available), then Step 1 is initiated. If it is determined that an altered range requirement does not exist, then energy transfer shall be sustained until said device load initiates the termination of energy transfer.

In Step 1, if Dual Session is unavailable, then a search is initiated for a near field session. If a near field session is detected and initiated, the device load will then receive power from the near field session. Once power is received then a determination is made whether or not there are altered range requirements by the device load leaving near field range, followed by a check for a far field Session. Failing both the near-field and far field check will default back to step 1. If it is determined that an altered range requirement does not exist, then energy transfer shall be sustained until said device load initiates the termination of energy transfer.

If the availability of dual session does not exist, and a near field session is not detected then a search is initiated for a far field session. If a far field session is detected then there is a determination as to whether altered range requirements exist. If so, then Step 1 is initiated. If it is determined that an altered range requirement does not exist, then energy transfer shall be sustained until said device load initiates the termination of energy transfer. If a far field session is not detected and determined available then Step 1 is initiated.

Figure 3:
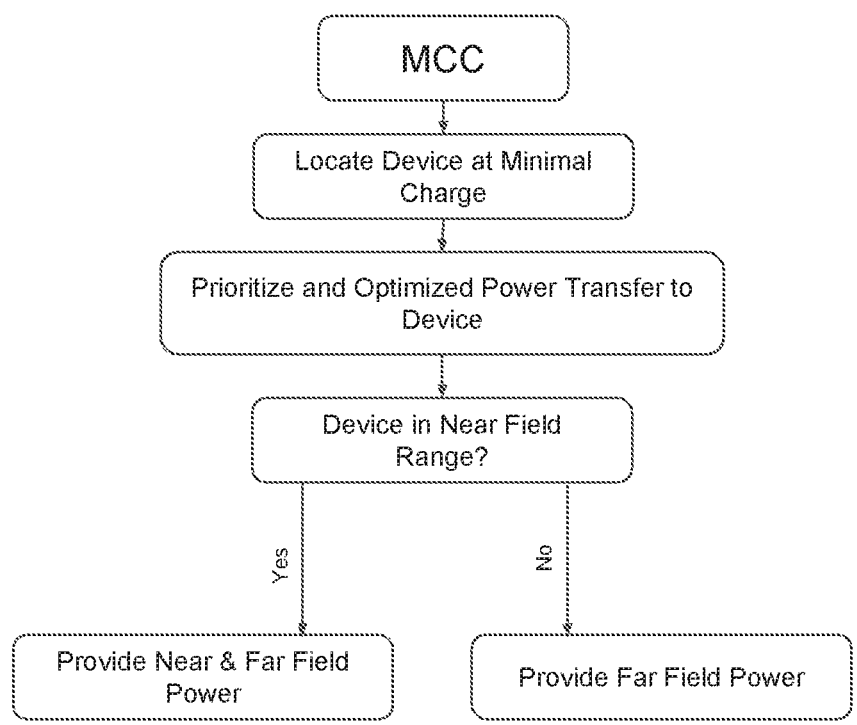
FIG. 3 is a flowchart that illustrates the method for intelligent power transfer management via the MCC based on power priority.

Referring now to FIG. 3, a flow chart of the method for intelligent energy transfer management via either the ETU MCC or the ERU MCC where applicable, based on power priority, is illustrated. In a first step, if a device load is in a low power state, then prioritization and optimization for power transfer to that device load is initiated by providing a near field and far field dual session if available. If a dual session is unavailable due to the device load being beyond near field range, then a determination is made as to whether the device load is in a far field range. If yes, then a far field session is initiated.

Figure 4:
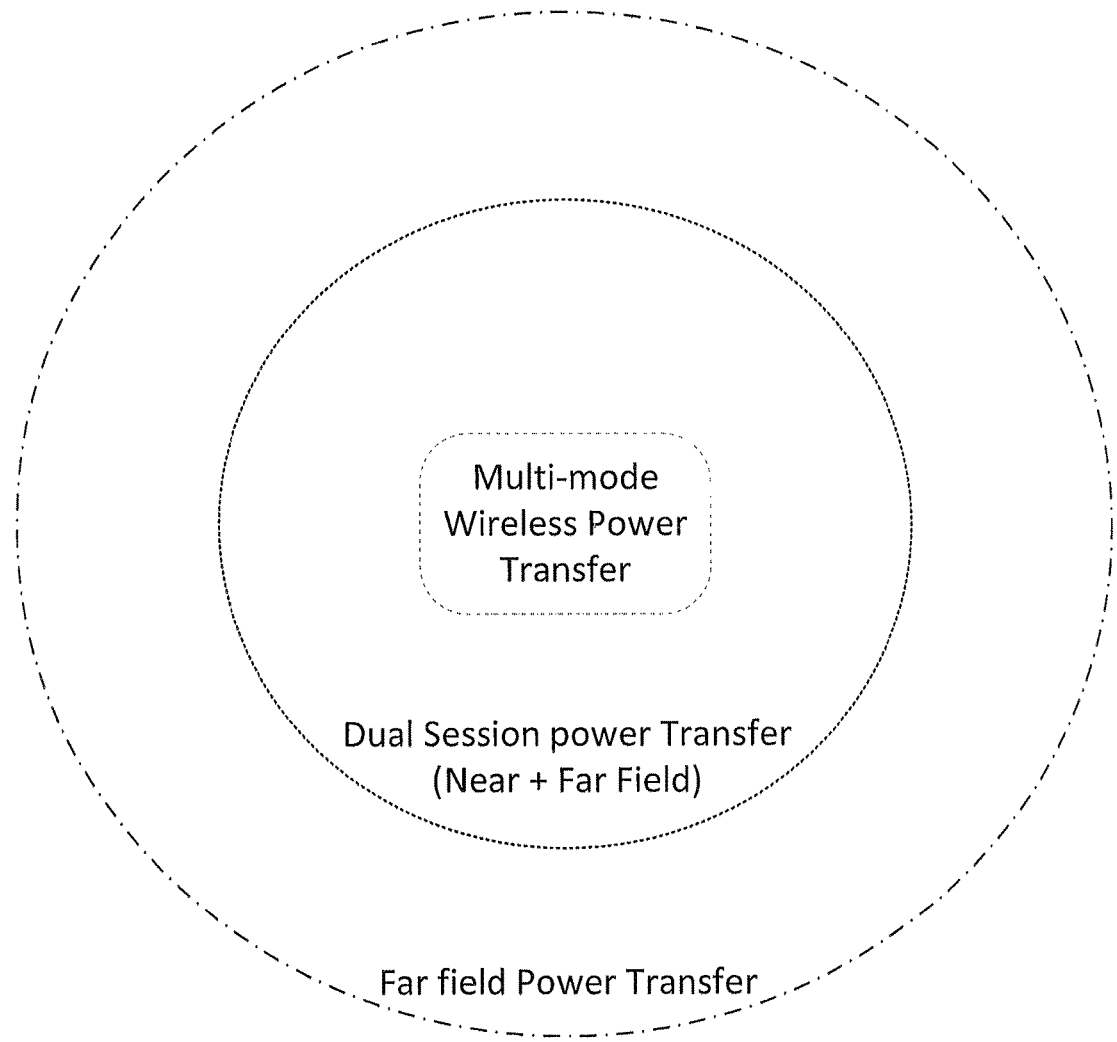
FIG. 4 is an illustration of the maximum power transfer when in range of both near field and far field modes.

As shown in FIG. 4, a dual session energy range diagram is illustrated. Maximum efficient energy transfer occurs when the ERU is in close proximity with the ETU. In this way, the ERU is able to receive energy from both the far field transmitter and the ETU source resonator simultaneously and providing higher combined power when applicable. The minimum energy transfer occurs when the ERU is at the maximum effective far field range where it can only receive energy transferred from the far field source transmitter.

Thus, in an embodiment the method of managing multi-mode transfer of wireless power, includes intelligently optimizing the wireless transfer of energy from a multi-mode energy transfer unit (ETU), and capturing and receiving the optimized energy transferred wirelessly over varying distances by one or more energy receiving units (ERU's). The energy transfer unit (ETU) includes a wireless communication protocol capable of independently identifying each energy receiving unit (ERU), engaging one or more identified ERU's, and sensing the range of each engaged ERU relative to the ETU, thus generating identification and range data.

The ETU processes the identification and range data to intelligently determine which mode or modes simultaneously, shall be induced during the wireless energy transfer session of each engaged energy receiving unit in a manner that optimizes energy transfer rate and efficiency. An engaged ERU, upon successfully establishing a communication link with the ETU via said communication protocol, and upon determining the presence of a corresponding software program installed on a device capable of running the software will provide relevant wireless energy transfer session data in a visual format via the software program.

The ERU may be integrated into a variety a device selected from a group of electronic devices consisting of a computer, laptop computer, mobile phone, smart phone, tablet computer, and tablet phone wherein the device is capable of facilitating and running a software program for the purpose of displaying session data and offering additional command options for the energy transfer session in a visual format.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), General Purpose Processors (GPPs), Microcontroller Units (MCUs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of some of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

As mentioned above, other embodiments and configurations may be devised without departing from the spirit of the invention and the scope of the appended claims.

The invention claimed is:

1. A method of providing wireless power to a device load, comprising:
   transmitting a directed energy signal over-the-air from an energy transferring unit (ETU) to an energy receiving unit (ERU) of the device load in a first mode when the ERU is in a far field range of the ETU; and,
   generating a resonant magnetic field over-the-air by said ETU wherein said resonant magnetic field is coupled with an ERU magnetic field at the same resonant frequency of the ERU of the device load in a second mode when the ERU is in a near field range of the ETU, the far field range being greater than the near field range,
   wherein energy is transferred to the ERU from the ETU by selectively managing the directed energy signal and the resonant magnetic field to deliver energy as needed by one or both of the modes simultaneously and with consideration to the device load's energy requirement, energy priority and device load's range relative to the ETU.

2. The method claim 1 wherein said ETU comprises an energy transferring unit micro-controller circuit (ETU MCC) configured to cooperate with an energy receiving unit micro-controller circuit (ERU MCC).

3. The method of claim 1 wherein:
   said ETU utilizes a far field transmitter configured to wirelessly transmit said directed energy signal, and a source resonator configured to generate said resonate magnetic field, and
   said ERU utilizes a far field receiver configured to wirelessly receive the directed energy signal transmitted from the far field transmitter, and a capture resonator configured to capture resonant magnetic energy in the near field generated by the source resonator.

4. The method of claim 2 further comprising the steps of:
   checking the requirements of a dual session to provide the device load with as much power as efficiently possible for charging and powering of said device load;
   transferring energy from both the near and far field sources if the requirements for a dual session are satisfied and an altered range requirement does not exist, wherein if an altered range requirement exists the requirements of a dual session are checked; and
   checking the availability of near field and inducing a near field session until altered range requirements exist, wherein if altered range requirements do exist then a far field search is initiated.

* * * * *